United States Patent
Takagi

(10) Patent No.: US 8,705,934 B2
(45) Date of Patent: Apr. 22, 2014

(54) MOVING PICTURE PROCESSING APPARATUS, MOVING PICTURE PROCESSING METHOD, AND PROGRAM

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 9 days.

(21) Appl. No.: 13/220,859

(22) Filed: Aug. 30, 2011

(65) Prior Publication Data

US 2012/0057846 A1    Mar. 8, 2012

(30) Foreign Application Priority Data

Sep. 6, 2010 (JP) ................................. P2010-198985

(51) Int. Cl.
*H04N 9/80* (2006.01)
*G11B 27/10* (2006.01)

(52) U.S. Cl.
CPC .................................... *G11B 27/105* (2013.01)
USPC ............................ 386/241; 348/700; 382/173

(58) Field of Classification Search
CPC ...................................................... G11B 27/105
USPC .................. 386/240, 278, 241, 280; 382/190;
348/700; 715/783, 838, 813, 821, 828
See application file for complete search history.

(56) References Cited

U.S. PATENT DOCUMENTS

| | | | |
|---|---|---|---|
| 7,212,731 B1 * | 5/2007 | Morotomi et al. | 386/241 |
| 7,751,683 B1 * | 7/2010 | Belknap | 386/278 |
| 7,869,658 B2 * | 1/2011 | Blose et al. | 382/224 |
| 8,224,159 B2 * | 7/2012 | Hirose et al. | 386/280 |
| 8,397,179 B2 * | 3/2013 | Takagi | 715/828 |
| 2008/0155459 A1 * | 6/2008 | Ubillos | 715/783 |
| 2009/0066838 A1 * | 3/2009 | Kasutani | 348/564 |
| 2009/0070677 A1 * | 3/2009 | Kim et al. | 715/719 |
| 2009/0207316 A1 * | 8/2009 | Cupal et al. | 348/700 |
| 2010/0172591 A1 * | 7/2010 | Ishikawa | 382/224 |
| 2010/0182501 A1 * | 7/2010 | Sato et al. | 348/441 |
| 2010/0189356 A1 * | 7/2010 | Sugita | 382/190 |

FOREIGN PATENT DOCUMENTS

JP    2009-111643    5/2009

* cited by examiner

*Primary Examiner* — Hung Dang
*Assistant Examiner* — Mishawn Dunn
(74) *Attorney, Agent, or Firm* — Sony Corporation

(57) ABSTRACT

A moving picture processing apparatus including a representative picture selection unit for selecting a predetermined number of representative pictures that are representative of a plurality of pictures from a plurality of pictures of a moving picture, and a configuration image generation unit for generating a configuration image in which the predetermined number of representative pictures are reduced at a fixed ratio and arranged in order of appearance of the representative pictures of the moving picture. The representative pictures are selected as the predetermined number of pictures adjusted to maximize a display occupancy rate of the configuration image in a predetermined range of display area.

16 Claims, 13 Drawing Sheets

FIG.6
 P1
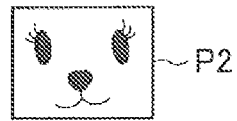 P2
 P3
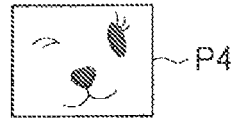 P4
 P5
 P6
 P7
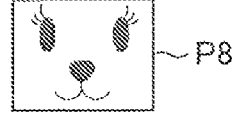 P8
 P9
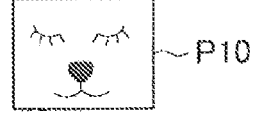 P10
 P11
 P12

MOVING PICTURE PROCESSING APPARATUS, MOVING PICTURE PROCESSING METHOD, AND PROGRAM

BACKGROUND

The present disclosure relates to a moving picture processing apparatus, a moving picture processing method, and a program.

A video (or moving picture) includes many pictures. Thumbnails of pictures of a moving picture are arranged in chronological order and displayed as a configuration image representing a configuration of the moving picture so that the configuration of the moving picture is recognized, as is known in the related art.

SUMMARY

However, if the display number of thumbnails is increased, there are cases in which the configuration image is increased in size with respect to a display area where the configuration image is displayed. If the configuration image is displayed at once so as to secure the browsability of the configuration of a moving picture, the thumbnails are reduced at a high ratio and displayed, and thus the legibility of representative pictures may be degraded. If part of the configuration image is displayed so as to secure the legibility of the configuration image, the configuration image is divided and displayed, and thus the browsability of the configuration of the moving picture may be degraded. Consequently, it is not possible to easily recognize the configuration of the moving picture through the configuration image in either case.

It is desirable to provide a moving picture processing apparatus, a moving picture processing method, and a program that can generate a configuration image from which a configuration of a moving picture can be easily recognized.

According to an embodiment of the present invention, there is provided a moving picture processing apparatus including a representative picture selection unit for selecting a predetermined number of representative pictures that are representative of a plurality of pictures from a plurality of pictures of a moving picture, and a configuration image generation unit for generating a configuration image in which the predetermined number of representative pictures are reduced at a fixed ratio and arranged in order of appearance of the representative pictures of the moving picture. The representative pictures are selected as the predetermined number of pictures adjusted to maximize a display occupancy rate of the configuration image in a predetermined range of display area.

In this configuration, the moving picture processing apparatus further includes a picture classification unit for classifying the plurality of pictures into a predetermined number of picture groups including respectively continuous pictures. The representative picture selection unit selects representative pictures that are representative of the pictures of the picture groups. The configuration image generation unit generates the configuration image in which the representative pictures of the predetermined number of picture groups are reduced at a fixed ratio and arranged in order of appearance of the picture groups of the moving picture. The plurality of pictures are classified into the predetermined number of picture groups adjusted to maximize the display occupancy rate of the configuration image in the predetermined range of display area.

In this configuration, the moving picture processing apparatus further includes a cut transition detection unit for detecting a transition between cuts from the moving picture including a plurality of cuts, and a representative cut selection unit for selecting a predetermined number of representative cuts from the plurality of cuts. The representative picture selection unit selects representative pictures that are representative of pictures of the representative cuts. The configuration image generation unit generates the configuration image in which the representative pictures of the predetermined number of representative cuts are reduced at a fixed ratio and arranged in order of appearance of the representative cuts of the moving picture. The representative cuts are selected as a predetermined number of cuts adjusted to maximize the display occupancy rate of the configuration image in the predetermined range of display area.

In this configuration, the configuration image generation unit generates the configuration image in which the predetermined number of representative pictures are arranged in a matrix in order of appearance of the representative pictures of the moving picture.

In this configuration, the configuration image generation unit generates the configuration image in which the representative pictures of the predetermined number of picture groups are arranged in a matrix in order of appearance of the picture groups of the moving picture.

In this configuration, the configuration image generation unit generates the configuration image in which the representative pictures of the predetermined number of representative cuts are arranged in a matrix in order of appearance of the representative cuts of the moving picture.

In this configuration, the representative picture selection unit selects the representative pictures based on representative values of feature quantities of the plurality of pictures and a change value of a feature quantity of each picture.

In this configuration, the representative cut selection unit selects the representative cuts based on representative values of feature quantities of the plurality of cuts and a change value of a feature quantity of each cut.

According to another embodiment of the present invention, there is provided a moving picture processing method that includes selecting a predetermined number of representative pictures that are representative of a plurality of pictures from a plurality of pictures of a moving picture, and generating a configuration image in which the predetermined number of representative pictures are reduced at a fixed ratio and arranged in order of appearance of the representative pictures of the moving picture. The representative pictures are selected as the predetermined number of pictures adjusted to maximize a display occupancy rate of the configuration image in a predetermined range of display area.

According to another embodiment of the present invention, there is provided a program for causing a computer to execute a moving picture processing method that includes selecting a predetermined number of representative pictures that are representative of a plurality of pictures from a plurality of pictures of a moving picture, and generating a configuration image in which the predetermined number of representative pictures are reduced at a fixed ratio and arranged in order of appearance of the representative pictures of the moving picture. The representative pictures are selected as the predetermined number of pictures adjusted to maximize a display occupancy rate of the configuration image in a predetermined range of display area.

According to the embodiments of the present disclosure described above, it is possible to provide a moving picture processing apparatus, a moving picture processing method, and a program that can generate a configuration image from which a configuration of the moving picture can be easily recognized.

BRIEF DESCRIPTION OF THE DRAWINGS

FIG. 6 is a diagram showing a configuration example of a moving picture;

DETAILED DESCRIPTION OF THE EMBODIMENT(S)

Figure 1:
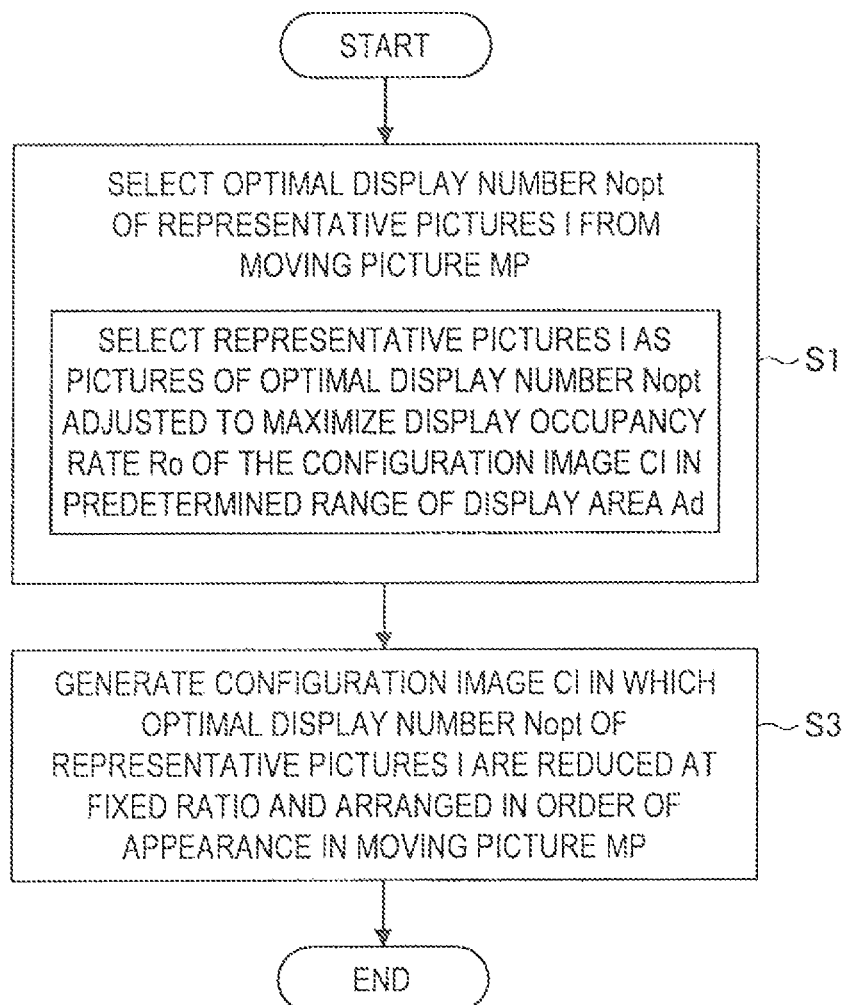
FIG. 1 is a flowchart showing a procedure of a moving picture processing method according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[1. Overview of Moving Picture Processing Method]

First, the overview of the moving picture processing method according to an embodiment of the present disclosure will be described with reference to FIG. 1. FIG. 1 shows a procedure of the moving picture processing method according to the embodiment of the present disclosure.

In the moving picture processing method according to the embodiment of the present disclosure as shown in FIG. 1, first, a predetermined number Nopt of representative pictures I that are representative of a plurality of pictures are selected from the plurality of pictures of a moving picture MP (step S1). Next, a configuration image CI in which the predetermined number Nopt of representative pictures I are reduced at a fixed ratio and arranged in order of appearance of the representative pictures I of the moving picture MP is generated (step S3). Here, in the processing of step S1, the representative pictures I are selected as the predetermined number Nopt of pictures adjusted to maximize a display occupancy rate Ro of the configuration image CI in a predetermined range of display area Ad.

Thereby, it is possible to generate the configuration image CI in which the browsabililiy of the configuration of the moving picture MP and the legibility of the configuration image CI can be secured using the predetermined number Nopt of representative pictures I selected to maximize the display occupancy rate Ro of the configuration image CI. Consequently, a user can easily recognize the configuration of the moving picture MP through the configuration image CI generated as described above.

<First Embodiment>

Next, the first embodiment of the present disclosure will be described with reference to FIGS. 2 to 9.

[2-1. Configuration of Moving Picture Processing Apparatus 1]

Figure 2:
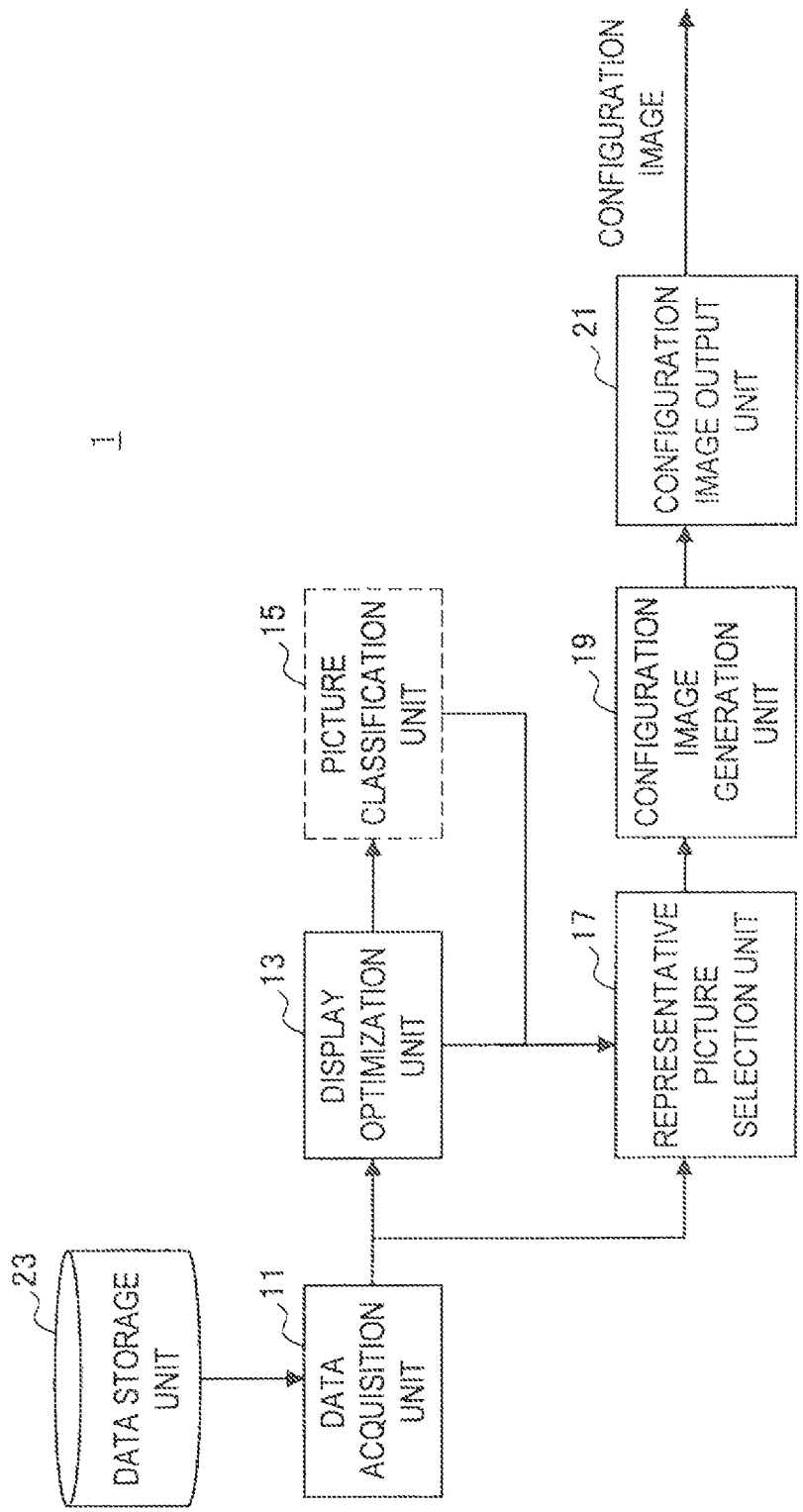
FIG. 2 is a block diagram showing a configuration of a moving picture processing apparatus according to a first embodiment.

First, the configuration of the moving picture processing apparatus 1 according to the first embodiment will be described with reference to FIG. 2. As shown in FIG. 2, the moving picture processing apparatus 1 according to the first embodiment includes a data acquisition unit 11, a display optimization unit 13, a picture classification unit 15, a representative picture selection unit 17, a configuration image generation unit 19, a configuration image output unit 21, and a data storage unit 23.

The data acquisition unit 11 acquires moving picture data MP or the like, and supplies the moving picture data MP to the display optimization unit 13 and the representative picture selection unit 17. The moving picture data MP is generally picture data of a frame format, and may be only picture data or a combination with audio data. The moving picture data MP may be acquired from the data storage unit 23 or an external apparatus (not shown).

The display optimization unit 13 will be described in detail later, but optimizes the display of representative pictures I to be displayed as a configuration image CI according to display conditions of the configuration image CI (a display range, a display size, and the like) and supplies an optimization result to the picture classification unit 15. Specifically, the display number of representative pictures I included in the configuration image CI is optimized to an optimal display number Nopt so as to secure the browsability of a configuration of the moving picture MP and the legibility of the configuration image CI.

The picture classification unit 15 will be described in detail later, but classifies a plurality of pictures into the optimal display number Nopt of picture groups Gp including respectively continuous pictures on the basis of a display optimization result, and supplies a classification result to the representative picture selection unit 17. The pictures are classified into the optimal display number Nopt of picture groups Gp on the basis of an index suitable for grouping such as the number of frames. The pictures may be classified into the optimal display number Nopt of picture groups Gp on the basis of the moving picture data MP, if necessary. In this case, the moving picture data NIP is supplied from the data acquisition unit 11 to the picture classification unit 15, although not shown in FIG. 2.

The representative picture selection unit 17 selects the representative pictures I that are representative of pictures of the picture groups Gp on the basis of the moving picture data MP and the picture classification result, and supplies a selection result to the configuration image generation unit 19. The representative pictures I are selected on the basis of an index suitable for selecting the representative pictures I such as a picture frame number, an audio volume associated with a picture, a picture luminance/color, a correlation between pictures, a motion of a subject of a picture, a picture processing/detection result, or a combination thereof.

The configuration image generation unit 19 generates the configuration image CI representing a configuration of the moving picture MP on the basis of the moving picture data and the selection result of the representative pictures I, and supplies the configuration image CI to the configuration image output unit 21. The configuration image CI is generated as a picture in which the optimal display number Nopt of the representative pictures I is reduced at a fixed ratio and arranged in order of appearance (order of time code or order of frame number) of the representative pictures I of the moving picture MP.

The configuration image output unit 21 outputs a generation result of the configuration image CI. The configuration image CI may be output to a display, a printer, a storage, or an external apparatus (none of which is shown) connected to the moving picture processing apparatus.

The data storage unit 23 stores the moving picture data MP, data attached to the moving picture data MP, data to be used in moving picture processing, and the like. The configuration image CI generated by the configuration image generation unit 19 may be stored in the data storage unit 23. In FIG. 2, the display of a connection relationship between the data storage unit 23 and the other components is partially omitted.

Hereinafter, the case where the representative pictures I are selected from the optimal display number Nopt of the picture groups Gp will be mainly described. However, the optimal display number Nopt of the representative pictures I may be directly selected from a plurality of pictures. In this case, the picture classification unit 15 can be omitted. In this case, the representative picture selection unit 17 selects the optimal display number Nopt of the representative pictures I as representative of the plurality of pictures on the basis of the moving picture data NIP and the display optimization result, and supplies the representative pictures I to the configuration image output unit 21. The configuration image CI is generated as a picture in which the representative pictures I of the optimal display number Nopt of the picture groups Gp are reduced at an optimal reduction rate Rropt to be described later and arranged in order of appearance of the representative pictures I of the moving picture MP.

Here, in the above-described functional configuration, the data acquisition unit 11, the display optimization unit 13, the picture classification unit 15, the representative picture selection unit 17, the configuration image generation unit 19, and the configuration image output unit 21 are constituted by an arithmetic processor such as a CPU or a digital signal processor (DSP). The data storage unit 23 is constituted by an internal storage such as a flash memory or an external storage such as a hard disk drive or a flexible disk drive. The CPU implements the moving picture processing method by expanding and executing a program read from a ROM or the like on a RAM. At least part of the above-described functional configuration may be constituted as hardware such as a dedicated logic.

[2-2. Operation of Moving Picture Processing Apparatus 1]

Next, the operation of the moving picture processing apparatus 1 according to the first embodiment will be described with reference to FIGS. 3 to 9.

Figure 3:
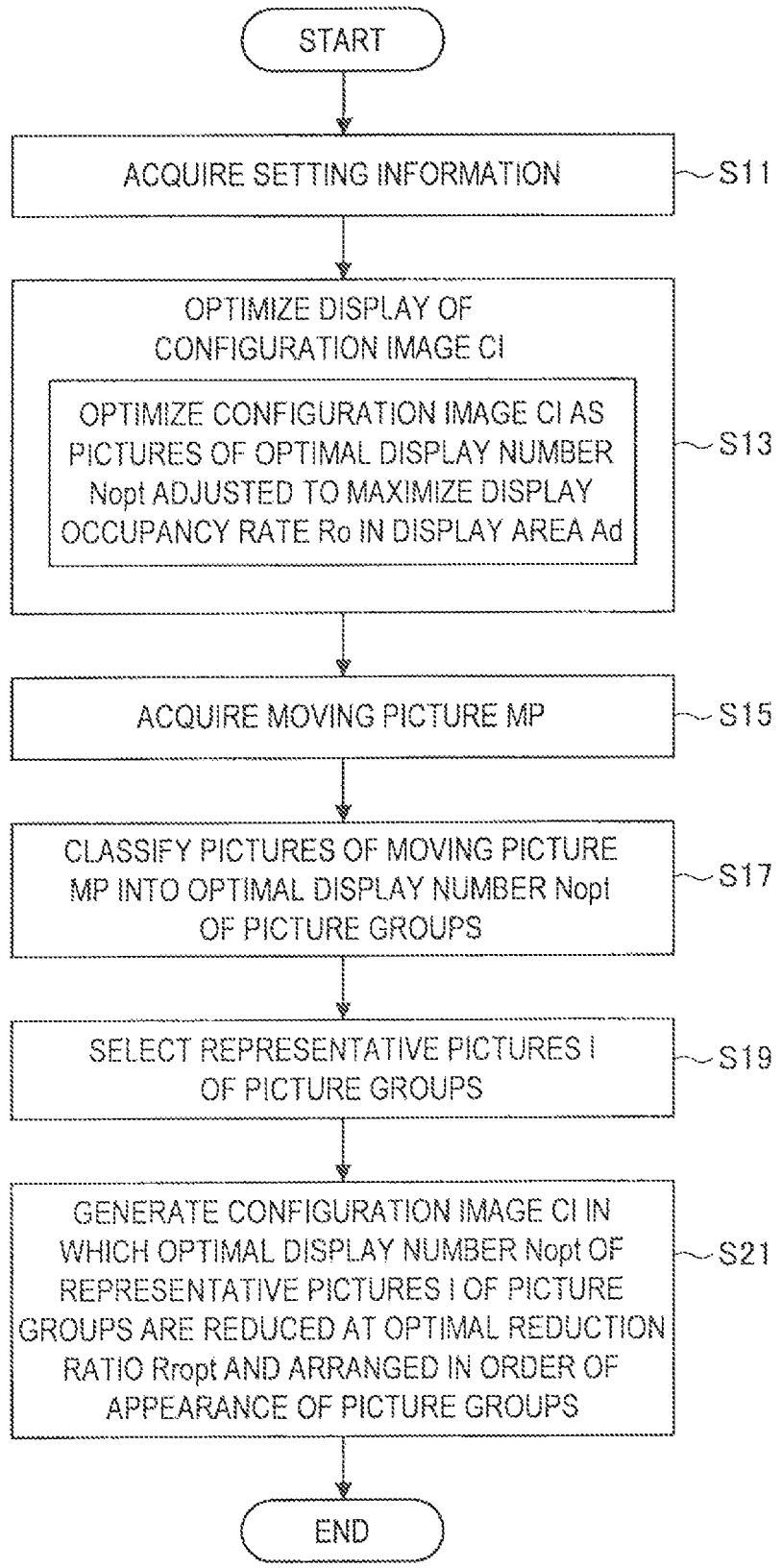
FIG. 3 is a flowchart showing the entire operation procedure of the moving picture processing apparatus.

FIG. 3 shows the entire operation procedure of the moving picture processing apparatus 1. As shown in FIG. 3, the data acquisition unit 11 acquires setting information such as a size of a display area Ad and a size of a picture of the moving picture MP (step S11) and supplies the setting information to the display optimization unit 13. The size of the display area Ad is set according to an output destination of the configuration image CI (and, of course, may be a print size). The picture size or the like is set as part of the moving picture data MP or the like. In the display optimization unit 13, the display of the configuration image CI is optimized on the basis of the setting information (step S13). In the display optimization, the optimal display number Nopt of the representative pictures I is decided to maximize a display occupancy rate Ro of the configuration image CI in the display area Ad.

Figure 4:
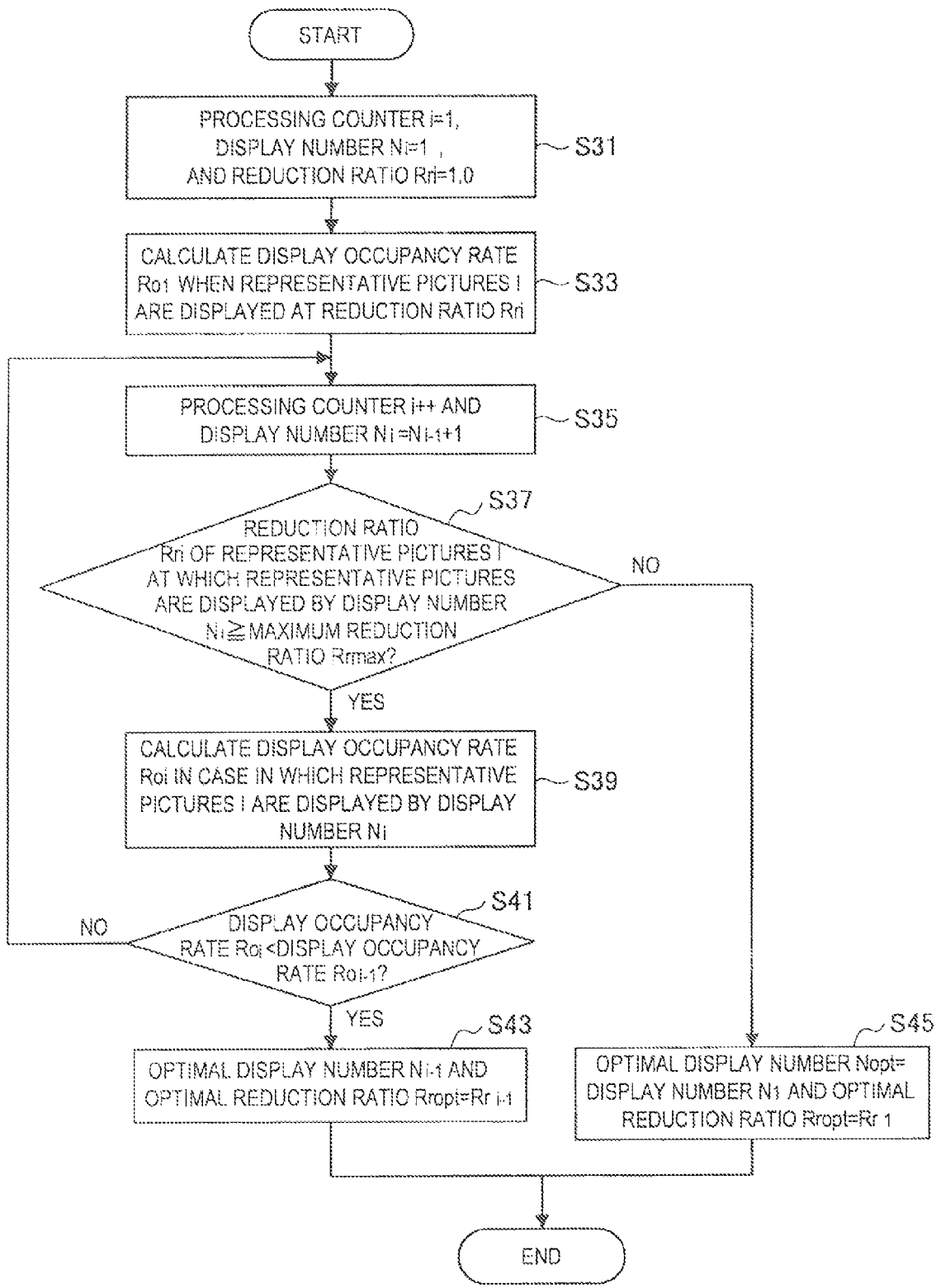
FIG. 4 is a flowchart showing an optimization procedure of displaying a configuration image.

FIG. 4 shows an optimization procedure of displaying the configuration image CI. Here, the display area Ad has a display width (the number of pixels) X of a first direction, a display height (the number of pixels) Y of a second direction, a size A ($=X \times Y$) of the display area Ad, and an aspect ratio RA ($=X/Y$). The representative picture I has an original-size width (the number of pixels) x of the first direction, an original-size height (the number of pixels) y of the second direction, an original size a ($=x \times y$), and an aspect ratio Ra ($=x/y$).

As shown in FIG. 4, first, a processing counter i is initialized (i=1), a display number $N_i$ of representative pictures I is initialized ($N_1=1$), and a reduction rate $Rr_i$ of the representative pictures I is initialized ($Rr_1=1.0$) (step S31). Next, a display occupancy rate $Ro_1$ ($=a \times Rr_1 \times N_1/A$) at which the representative pictures I are displayed at a reduction rate $Rr_1$ is calculated (step S33). The display occupancy rate $Ro_1$ is temporarily stored for subsequent processing.

Next, the processing counter i is incremented by 1 (i=i+1), and the display number $N_i$ is incremented by 1 ($N_i=N_{i-1}+1$) (step S35).

Next, it is determined whether the reduction rate $Rr_i$ of the representative picture I at which the representative pictures I are displayed by the display number $N_i$ is equal to or greater than a maximum reduction rate Rrmax (step S37). The reduction rate $Rr_i$ of the representative picture I is calculated as a maximum value in which the display number $N_i$ of the representative pictures I can be arranged and displayed in the display area Ad without overlap. The maximum reduction rate Rrmax is preset as a reduction rate (Rrmax=0.5, etc.) capable of securing the legibility of the representative pictures I after reduction.

If a determination result of step S37 is positive, the display occupancy rate Ito; at which the representative pictures I are displayed by the display number $N_1$ is calculated (step S39). The display occupancy rate $Ro_i$ is calculated by dividing a value, obtained by multiplying the original size a of the representative picture I by the reduction rate $Rr_i$ and the display number $N_i$, by the size A of the display area Ad ($Ro_i=a \times Rr_i \times N_i/A$). The display occupancy rate $Ro_i$ is temporarily stored for subsequent processing.

Next, it is determined whether the display occupancy rate $Ro_i$ is less than the display occupancy rate $Ro_{i-1}$ of the display number $N_{i-1}$ (step S41). If a determination result is positive, the display number $N_{i-1}$ is substituted into the optimal display number Nopt and the reduction rate $Rr_{i-1}$ is substituted into the optimal reduction rate Rropt (step S43), and the display optimization is completed. That is, the display of the configuration image I is optimized if the representative pictures I are displayed by the display number $N_{i-1}$. On the other hand, if the determination result is negative, the processing returns to step S35.

On the other hand, if the determination result of step S37 is negative, the display number $N_1$ is substituted into the optimal display number Nopt, the reduction rate $Rr_1$ is substituted into the optimal reduction rate Rropt (step S45), and the display optimization is completed. That is, the display of the configuration image I is optimized if the representative pictures I are displayed by the display number $N_1=1$.

Figure 5:
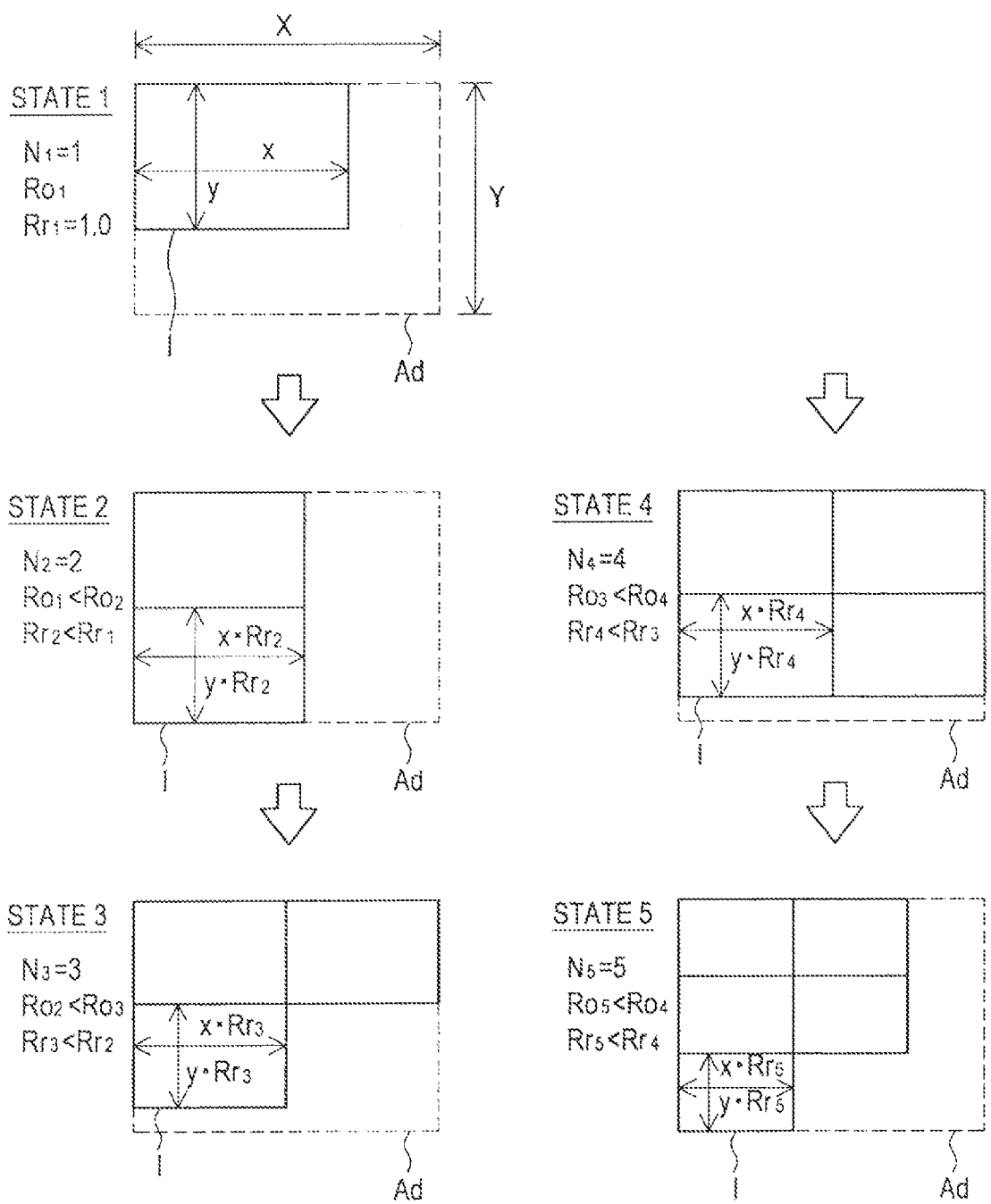
FIG. 5 is a diagram showing an example of the optimization procedure of displaying a configuration image.

FIG. 5 shows an example of an optimization procedure of displaying the configuration image CI. In FIG. 5, the display area Ad is assumed to be vertically long with respect to the representative picture I (Aspect Ratio RA of Display Area Ad<Aspect Ratio Ra of Representative Picture I).

In state 1, a relationship between the display area Ad and the representative picture I is x<X<x×2 and y<Y<y×2, and two or more representative pictures I may not be displayed in the original size a. In state 1, the display occupancy rate $Ro_1$ at which the display number $N_1=1$ of the representative picture I is displayed is calculated.

In state 2, $N_2 (=2)$ representative pictures I are maximally displayed at a reduction rate $Rr_2 (=(Y/y/2)/y, Rr_2<Rr_1)$ when two representative pictures I are arranged in the full display height Y. In state 2, a display occupancy rate $Ro_2$ at which the display number $N_2=2$ of representative pictures I are displayed is calculated. Here, the optimization is continued by setting Display Occupancy Rate $Ro_1$<Display Occupancy Rate $Ro_2$.

In state 3, $N_3 (=3)$ representative pictures I are maximally displayed at a reduction rate $Rr_3 (=(X/x/2)/x, Rr_3<Rr_2)$ when two representative pictures I are arranged in the full display width X. In state 3, a display occupancy rate $Ro_3$ at which the display number $N_3=3$ of the representative pictures l are displayed is calculated. Here, the optimization is continued by setting Display Occupancy Rate $Ro_2$<Display Occupancy Rate $Ro_3$.

In state 4, like state 3, $N_4 (=4)$ representative pictures I are maximally displayed at a reduction rate $Rr_4 (=Rr_3)$. In state 4, a display occupancy rate $Ro_4$ at which the display number $N_4=4$ of the representative pictures I are displayed is calculated. Here, the optimization is continued by setting Display Occupancy Rate $Ro_3$<Display Occupancy Rate $Ro_4$.

In state 5, $N_5 (=5)$ representative pictures I are maximally displayed at a reduction rate $Rr_5 (=(Y/y/3)/y, Rr_5<Rr_4)$ when three representative pictures I are arranged in the full display height Y. In state 5, a display occupancy rate $Ro_5$ at which the display number $N_5=5$ of the representative pictures I are displayed is calculated. Here, the optimization is completed by setting Display Occupancy Rate $Ro_5$<Display Occupancy Rate $Ro_4$. The optimal display number Nopt=$N_4$=4 and the optimal reduction rate Rropt=$Rr_4$.

If the display optimization is completed, the data acquisition unit 11 acquires the moving picture data MP (step S15) as shown in FIG. 3, and supplies the moving picture data MP to the picture classification unit 15. The picture classification unit 15 classifies pictures of the moving picture MP into the optimal display number Nopt of picture groups Gp on the basis of a display optimization result (step S17), and supplies a classification result to the representative picture selection unit 17.

The representative picture selection unit 17 selects representative pictures I of the picture groups Gp on the basis of the moving picture data MP and the picture classification result (step S19), and supplies a selection result to the configuration image generation unit 19. The configuration image generation unit 19 generates a configuration image CI on the basis of the moving picture data MP and the selection result of the representative pictures I (step S21). The configuration image CI is generated as a picture in which the representative pictures I of the optimal display number Nopt of the picture groups Gp are reduced at the optimal reduction rate Rropt and arranged in order of appearance of the picture groups Gp.

Image classification processing ma) be omitted. In this case, in the representative picture selection unit 17, the moving picture data MP is supplied from the data acquisition unit 11 and the optimal display number Nopt of the representative pictures I are selected from pictures of the moving picture MP.

Figure 7:
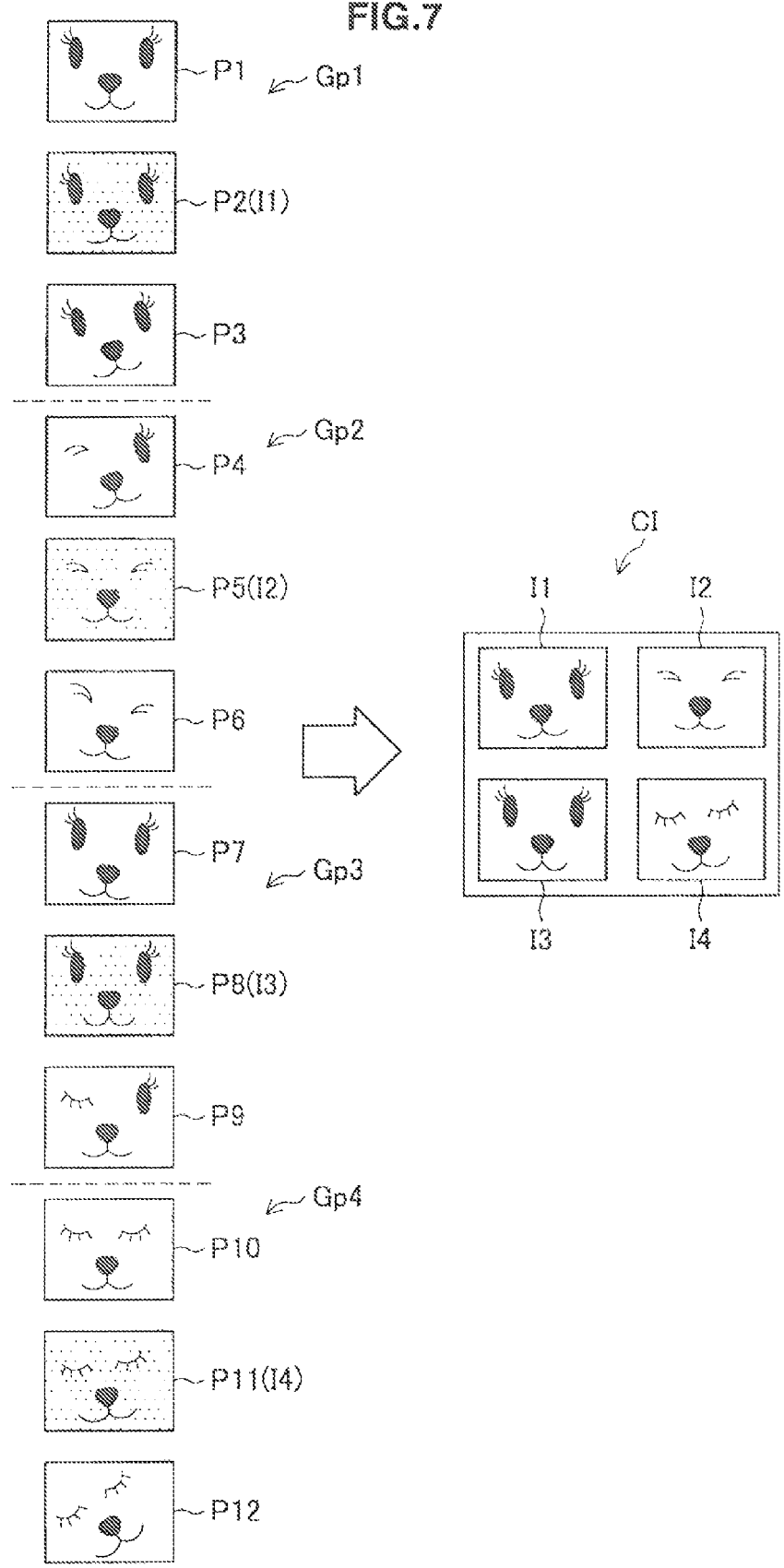
FIG. 7 is a diagram showing a first generation example of a configuration image.

FIG. 6 shows a configuration example of the moving picture MP. In the example shown in FIG. 6, the moving picture MP includes 12 frame pictures P1 to P12. For example, the pictures P1 to P12 may be pictures extracted from a number of frames such as pictures thinned at 100-frame intervals from 1200 frame pictures FIG. 7 shows a first generation example of a configuration image CI. In the example shown in FIG. 7, first, pictures P1 to P12 are classified into the optimal display number Nopt=4 of picture groups Gp1 to Gp4. Here, the pictures P1 to P12 are classified into the picture group Gp1 (the pictures P1 to P3), the picture group Gp2 (the pictures P4 to P6), the picture group Gp3 (the pictures P7 to P9), and the picture group Gp4 (the pictures P10 to P12). That is, the moving picture MP is classified so that the picture numbers of the picture groups Gp1 to Gp4 are uniform on the basis of the number of pictures of the moving picture MP and the optimal display number Nopt.

Next, the representative pictures I of the picture groups Gp1 to Gp4 are selected. Here, representative pictures I1 to I4 of the picture groups Gp1 to Gp4 are selected as pictures P2, P5, P8, and P11, that is, pictures corresponding to center frames of the picture groups Gp. In this case, the representative pictures I1 to I4 are selected as the center frames of the picture groups Gp1 to Gp4 on the basis of each picture frame number of the moving picture MP and the optimal display number Nopt. Instead of the pictures corresponding to the center frames, the representative pictures I may be selected as first frames, last frames, or the like.

A configuration image CI including the selected representative pictures I1 to I4 is generated. Here, the configuration image CI is generated as a picture in which the representative pictures I1 to I4 are reduced at the optimal reduction rate Rropt and arranged in a 2×2 matrix in order of appearance of the picture groups Gp1 to Gp4. The arrangement of the configuration image CI may be changed to a 1×4 matrix, a 4×1 matrix, or the like, instead of the 2×2 matrix, according to the size of the display area Ad.

Figure 8:
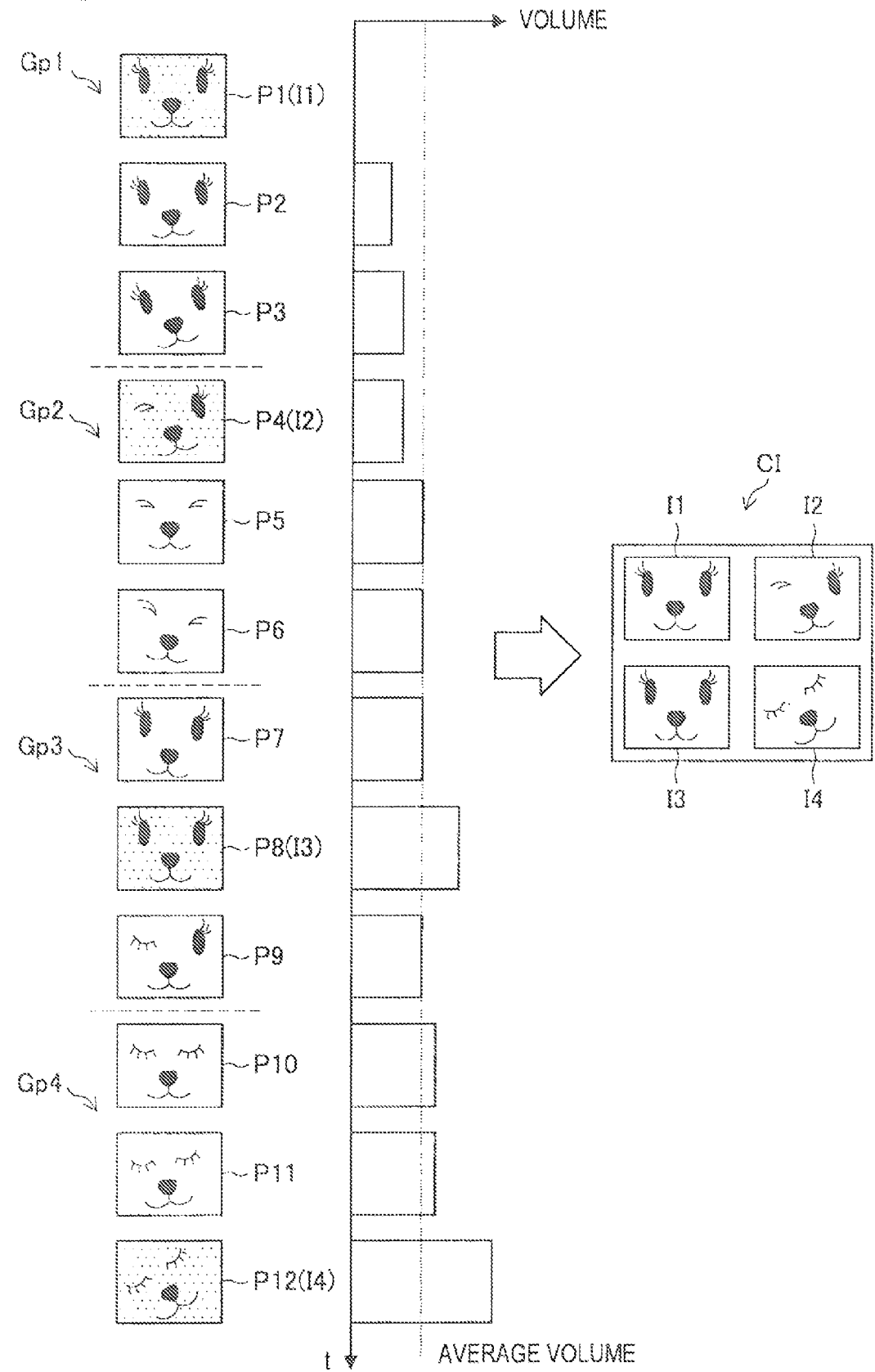
FIG. 8 is a diagram showing a second generation example of a configuration image.

FIG. 8 shows a second generation example of a configuration image CI. In the example shown in FIG. 8, like that shown in FIG. 7, 12 frame pictures P1 to P12 are classified into a picture group Gp1 (the pictures P1 to P3), a picture group Gp2 (the pictures P4 to P6), a picture group Gp3 (the pictures P7 to P9), and a picture group Gp4 (the pictures P10 to P12).

For the pictures P1 to P12, a volume of an audio associated with each frame is calculated on the basis of audio processing of the moving picture data NIP, and an average volume of 12 frames is further calculated. FIG. 8 shows a volume of an audio associated with each frame and an average volume along with the pictures P1 to P12.

Next, representative pictures I1 to I4 of the picture groups Gp1 to Gp4 are selected. Here, the representative pictures I1 to I4 of the picture groups Gp1 to Gp4 are selected as pictures corresponding to frames in which differences from the average volume (absolute values) are largest among frames of the picture groups Gp1 to Gp4. In place of the pictures in which the differences from the average volume (the absolute value) are largest, the representative pictures I1 to I4 may be selected to be pictures having the smallest, average pictures, a combination of the average pictures and the pictures having the largest or smallest, or the like.

For example, in the example shown in FIG. 8, the picture P1 of volume 0 is selected in the picture group Gp1, the picture P4 of a volume less than the average volume is selected in the picture group Gp2, the picture P8 of a volume greater than the average volume is selected in the picture group Gp3, and the picture P12 of a volume much greater than the average volume is selected in the picture group Gp4.

A configuration image CI including the selected representative pictures I1 to I4 is generated. Here, the configuration image CI is generated as a picture in which the representative pictures I1 to I4 are reduced at the optimal reduction rate Rropt and arranged in a 2×2 matrix in order of appearance of the picture groups Gp1 to Gp4.

Figure 9:
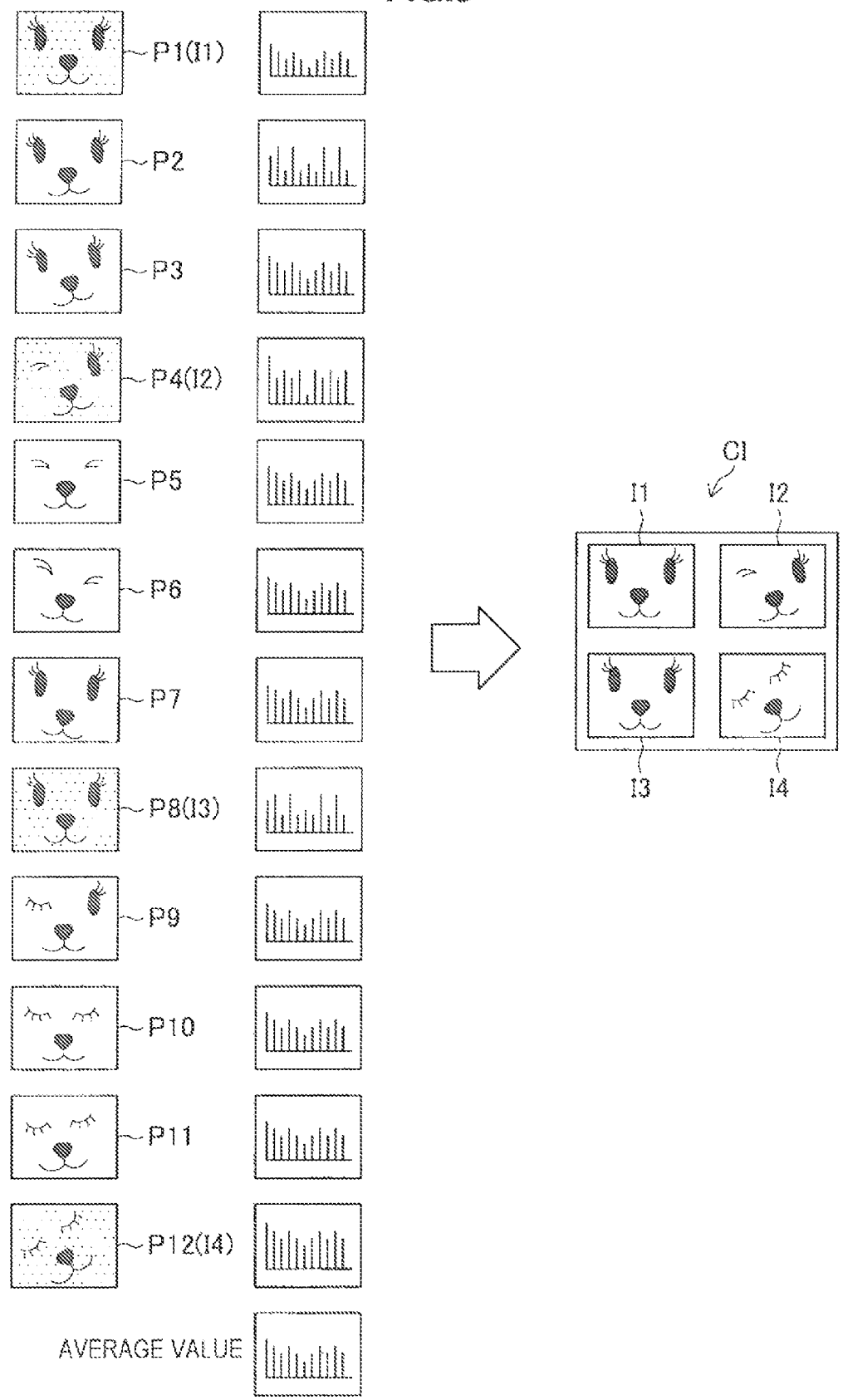
FIG. 9 is a diagram showing a third generation example of a configuration image.

FIG. 9 shows a third generation example of a configuration image CI. In the example shown in FIG. 9, picture classification processing is omitted, unlike those shown in FIGS. 7 and 8.

For 12 frame pictures P1 to P12 in the example shown in FIG. 9, histograms indicating screen luminances of pictures through normalization are calculated on the basis of picture processing of the moving picture data MP, and an average histogram of the 12 frames is further calculated. In the histograms, a frequency of each classification in a case in which luminances of pixels included in the pictures are classified at predetermined luminance intervals is indicated. In FIG. 9, the normalization histograms and the average histogram are shown along with the pictures P1 to P12.

Next, the optimal display number Nopt=4 of representative pictures I1 to I4 are selected from among the pictures of the moving picture data MP. Here, the representative pictures I1 to I4 are selected as the top 4 pictures in differences from the average histogram (absolute values). In place of the top 4 pictures in the differences from the average histogram, the representative pictures I1 to I4 may be selected as the bottom 4 pictures, pictures having the average pictures, a combination of the average pictures and the top and bottom pictures, or the like. For example, in the example shown in FIG. 9, the top 4 pictures P1, P4, P8, and P12 in the differences from the average histogram are selected.

A configuration image CI including the selected representative pictures I1 to I4 is generated. Here, the configuration image CI is generated as a picture in which the representative pictures I1 to I4 are reduced at the optimal reduction rate Rropt and arranged in a 2×2 matrix in order of appearance of the picture groups Gp1 to Gp4.

[2-3. Summary]

According to the first embodiment, it is possible to generate the configuration image CI in which the browsability of a configuration of a moving picture MP and the legibility of the configuration image CI can be secured using an optimal display number Nopt of representative pictures I selected to maximize a display occupancy rate Ro of the configuration image CI. In particular, it is possible to generate a configuration image CI using representative pictures I unbiased in temporal context of a moving picture MP by classifying a plurality of pictures of the moving picture MP into an optimal display number Nopt of picture groups Gp and selecting the representative pictures I from the picture groups Gp.

<Second Embodiment>

Next, the second embodiment of the present disclosure will be described with reference to FIGS. 10 to 13. Hereinafter, overlapping description with the first embodiment is omitted.

[3-1. Configuration of Moving Picture Processing Apparatus 2]

Figure 10:
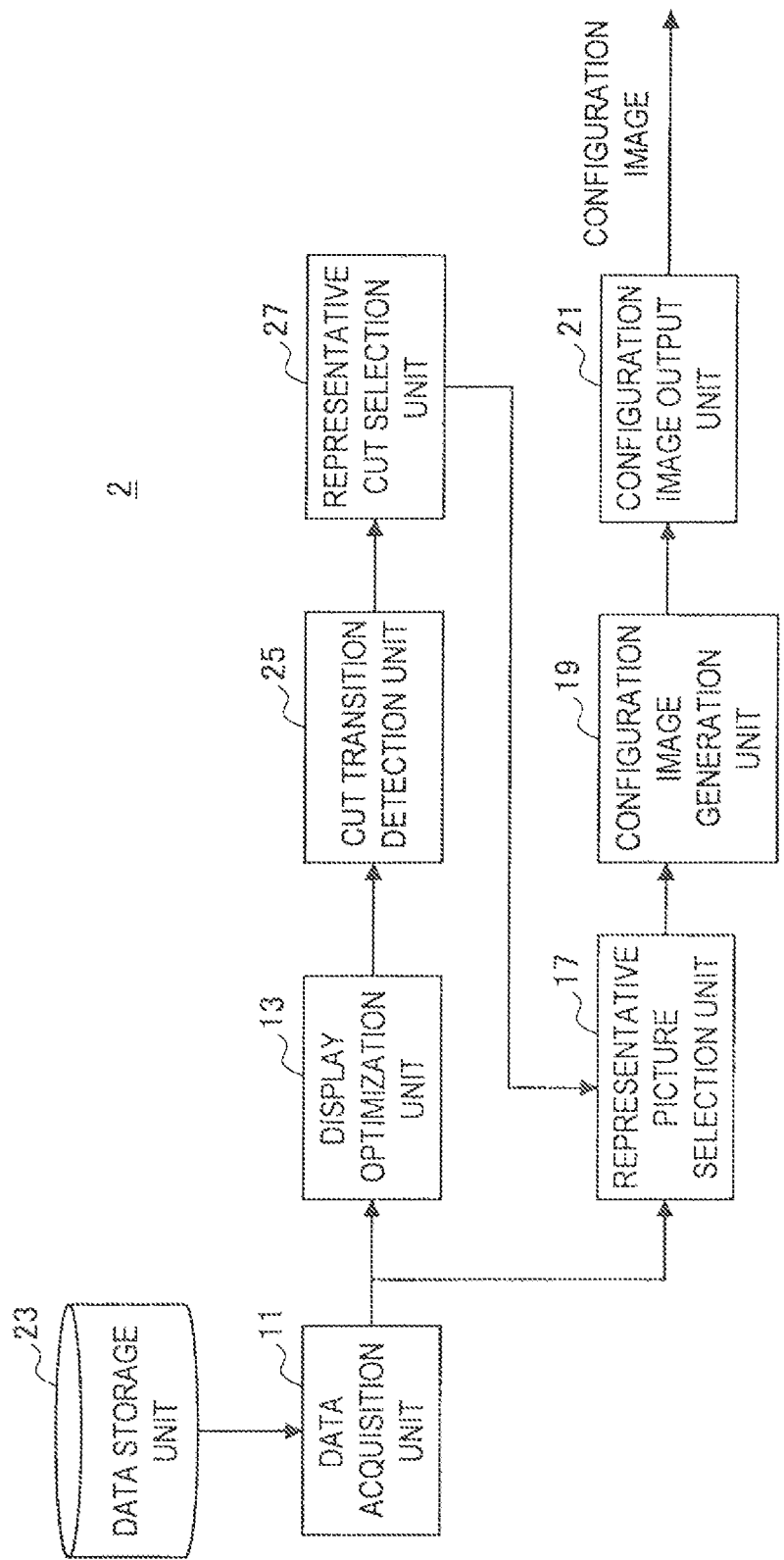
FIG. 10 is a block diagram showing a configuration of a moving picture processing apparatus according to a second embodiment.

First, the configuration of the moving picture processing apparatus 2 according to the second embodiment will be described with reference to FIG. 10. As shown in FIG. 10, the moving picture processing apparatus 2 according to the second embodiment includes a cut transition detection unit 25 and a representative cut selection unit 27 in addition to a data acquisition unit 11, a display optimization unit 13, a picture classification unit 15, a representative picture selection unit 17, a configuration image generation unit 19, a configuration image output unit 21, and a data storage unit 23.

The cut transition detection unit 25 detects a cut transition of a moving picture MP including a plurality of cuts on the basis of moving picture data MP supplied from the data acquisition unit 11, and supplies a detection result to the representative cut selection unit 27. The cut transition is a cut change in the moving picture MP. The cut transition is detected on the basis of a similarity of a feature quantity by obtaining feature quantities of a picture and/or an audio in frames occurring in succession. As the feature quantities of a picture and/or an audio, a volume/tone/intonation of an audio associated with a picture, a luminance/color of a picture, a correlation between pictures, a motion of a subject in a picture, a picture processing/picture detection result, a combination thereof, or the like can be used. A feature quantity obtained upon detection of the cut transition is stored in the data storage unit 23 or the like, and may be used in other processing.

The representative cut selection unit 27 selects the optimal display number Nopt of representative cuts from a plurality of cuts on the basis of the cut transition detection result and the moving picture data MP, and supplies a selection result to the representative picture selection unit 17. The representative cuts are cuts that are representative of the plurality of cuts of the moving picture MP. The representative cuts are selected on the basis of similarities of feature quantities by obtaining feature quantities of pictures and/or audios of the cuts. The feature quantity may be obtained as a feature quantity of a picture of a specific position of the cuts, and may be obtained as an average value between feature quantities of a plurality of pictures of the cuts. The feature quantities obtained upon selection of the representative cuts are stored in the data storage unit 23 or the like, and may be used in other processing.

Here, in the above-described functional configuration, the cut transition detection unit 25 and the representative cut selection unit 27 are constituted by an arithmetic processor such as a CPU or a DSP.

[3-2. Operation of Moving Picture Processing Apparatus 2]

Next, the operation of the moving picture processing apparatus 2 according to the second embodiment will be described with reference to FIGS. 11 to 13.

Figure 11:
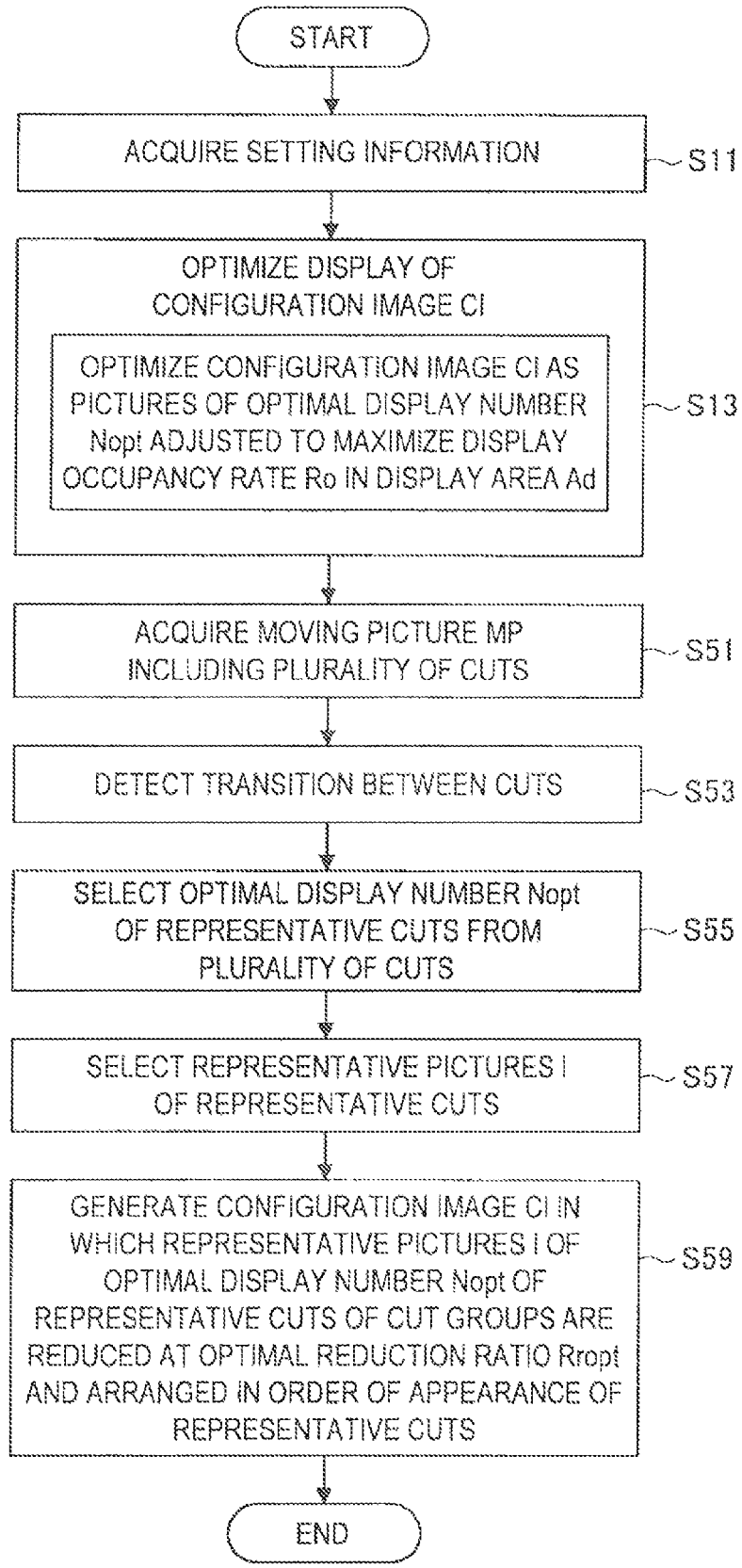
FIG. 11 is a flowchart showing the entire operation procedure of the moving picture processing apparatus.

FIG. 11 shows the entire operation procedure of the moving picture processing apparatus 2. First, as in the first embodiment, the data acquisition unit 11 acquires setting information (step S11), and the display optimization unit 13 optimizes the display of a configuration image CI (step S13) and supplies an optimization result to the cut transition detection unit 25.

If the display optimization is completed, the data acquisition unit 11 acquires moving picture data MP including a plurality of cuts (step S51) as shown in FIG. 11, and supplies the moving picture data MP to the cut transition detection unit 25. The cut transition detection unit 25 detects a transition between cuts from the moving picture data MP (step S53), and supplies a detection result to the representative cut selection unit 27. The processing of steps S51 and S53 may be performed before the processing of steps S11 and S13. The representative cut selection unit 27 selects the optimal display number Nopt of representative cuts of from the plurality of cuts (step S55), and supplies a selection result to the representative picture selection unit 17.

The representative picture selection unit 17 selects representative pictures I of representative cuts on the basis of the moving picture data MP and the representative cut selection result (step S57), and supplies a selection result to the configuration image generation unit 19. The representative pictures I are selected as in the first embodiment. The configuration image generation unit 19 generates a configuration image CI on the basis of the moving picture data MP and the selection result of the representative pictures I (step S59). The configuration image CI is generated as a picture in which the representative pictures I of the optimal display number Nopt of the representative cuts are reduced at the optimal reduction rate Rropt and arranged in order of appearance of the representative cuts.

Figure 12:
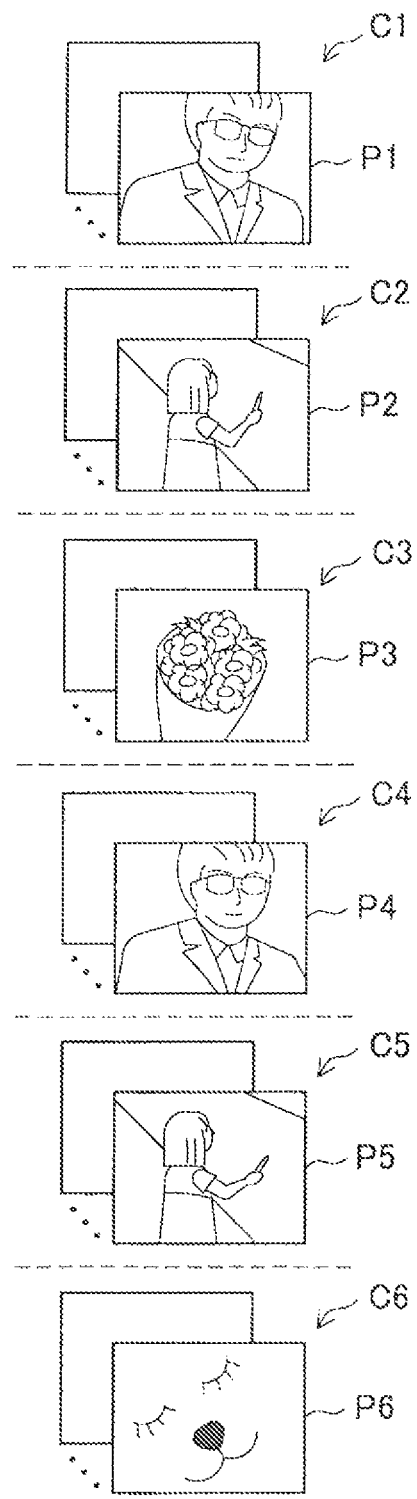
FIG. 12 is a diagram showing a configuration example of a moving picture.

FIG. 12 shows a configuration example of a moving picture MP. In the example shown in FIG. 12, the moving picture MP includes 6 cut pictures C1 to C6. The cuts C1 to C6 include pictures of an arbitrary number of frames.

Figure 13:
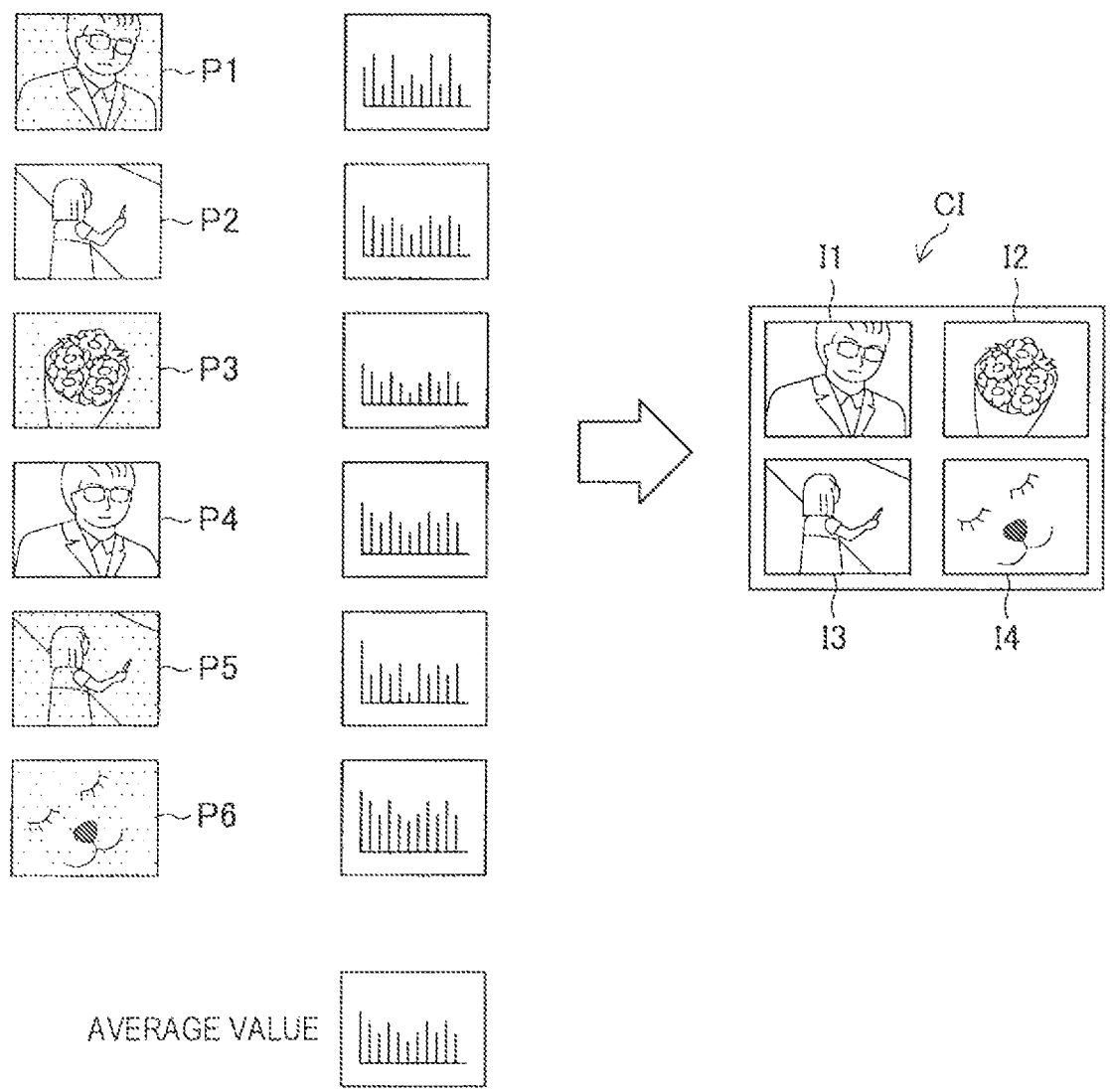
FIG. 13 is a diagram showing a generation example of a configuration image.

FIG. 13 shows a generation example of a configuration image CI. For cuts C1 to C6 in the example shown in FIG. 13, histograms indicating screen luminances of first frame pictures (first pictures) P1 to P6 of the cuts C1 to C6 through normalization are calculated on the basis of picture processing of moving picture data MP, and an average histogram of the 6 cuts is further calculated. In the histograms, a frequency of each classification at which luminances of pixels included in the first pictures P1 to P6 are classified at predetermined luminance intervals is indicated. In FIG. 13, the normalization histograms and the average histogram of the first pictures P1 to P6 are shown along with the first pictures P1 to P6.

Next, an optimal display number Nopt=4 of representative cuts C1, C3, C5, and C6 are selected from the cuts C1 to C6. Here, the representative cuts are selected as the top 4 cuts in differences from the average histogram of the first pictures P1 to P6. In place of the top 4 cuts in the differences from the average histogram, the representative cuts may be selected as the bottom 4 cuts, average cuts, a combination of the average cuts and top and bottom cuts, or the like. For example, in the example shown in FIG. 13, the top 4 cuts C1, C3, C5, and C6 in the differences from the average histogram are selected.

Representative pictures I1, I2, I3, and I4 are respectively selected from the selected representative cuts C1, C3. C5, and C6, and a configuration image CI including the representative pictures I1 to I4 is generated. The representative picture I of the representative cut may be identical to or different from the first picture P of the representative cut. Here, the configuration image CI is generated as a picture in which the representative pictures I1 to I4 of the representative cuts C1, C3, C5, and C6 are reduced at the optimal reduction rate Rropt and arranged in a 2×2 matrix in order of appearance of the representative cuts C1, C3, C5, and C6.

[3-3. Summary]

According to the second embodiment, it is possible to generate a configuration image CI in which the browsability of a configuration of a moving picture MP including a plurality of cuts and the legibility of the configuration image CI can be secured using representative pictures I of an optimal display number Nopt of representative cuts selected to maximize a display occupancy rate Ro of the configuration image CI. In particular, it is possible to generate a configuration image CI using representative pictures I unbiased in cut configurations of the moving picture MP by selecting the optimal display number Nopt of the representative cuts from a plurality of cuts of the moving picture MP.

It should be understood by those skilled in the art that various modifications, combinations, sub-combinations and alterations may occur depending on design requirements and other factors insofar as they are within the scope of the appended claims or the equivalents thereof.

For example, the configuration image CI is described as pictures in which an optimal display number Nopt=4 of representative pictures I are arranged in a 2×2 matrix in the above-described embodiment. However, the configuration image CI may be generated using a different optimal display number Nopt according to their display conditions, and may be generated as pictures in which representative pictures I are arranged in a different matrix even when the optimal display number Nopt is identical.

The present disclosure contains subject matter related to that disclosed in Japanese Priority Patent Application JP 2010-198985 filed in the Japan Patent Office on Sep. 6, 2010, the entire content of which is hereby incorporated by reference.

What is claimed is:

1. A moving picture processing apparatus comprising:
a display optimization unit operable to determine a number of representative pictures to be displayed in a configuration image to maximize a display occupancy rate of the configuration image in a predetermined range of a display area;
a picture classification unit operable to classify a plurality of pictures in a moving picture into picture groups, wherein a number of the picture groups equals the determined number of representative pictures;
a representative picture selection unit operable to select a first representative picture from each of the picture groups, wherein the selected first representative picture is a representative of pictures of the corresponding picture group; and
a configuration image generation unit operable to generate the configuration image in which the selected first representative picture from each of the picture groups is reduced in size at a fixed ratio and arranged in an order of appearance of the selected first representative picture in the moving picture.

2. The moving picture processing apparatus according to claim 1, wherein the configuration image generation unit is operable to generate the configuration image in which the selected first representative picture from each of the picture groups is arranged in a matrix in the order of appearance of the selected first representative picture in the moving picture.

3. The moving picture processing apparatus according to claim 1, wherein the representative picture selection unit is operable to select the first representative picture from each of the picture groups based on representative values of feature quantities of the plurality of pictures and a change value of a feature quantity of each picture of the plurality of pictures.

4. The moving picture processing apparatus according to claim 1, wherein
the display optimization unit is operable to determine the number of representative pictures to be displayed in the configuration image to secure browsability and legibility of the configuration image in the predetermined range of the display area.

5. The moving picture processing apparatus according to claim 1, further comprising:
a data acquisition unit operable to acquire setting information of the display area and supplying the setting information to the display optimization unit,
wherein the setting information comprises a size of the display area and a size of the plurality of pictures in the moving picture.

6. The moving picture processing apparatus according to claim 1, wherein:
the picture classification unit is operable to classify the plurality of pictures into picture groups comprising continuous pictures,
wherein the configuration image generation unit is operable to generate the configuration image in which the selected first representative picture from each of the picture groups is reduced in size at the fixed ratio and arranged in an order of appearance of the picture groups in the moving picture, and wherein the plurality of pictures are classified into the picture groups to maximize the display occupancy rate of the configuration image in the predetermined range of the display area.

7. The moving picture processing apparatus according to claim 6, wherein the configuration image generation unit is operable to generate the configuration image in which the selected first representative picture from each of the picture groups is arranged in a matrix in the order of appearance of the picture groups in the moving picture.

8. The moving picture processing apparatus according to claim 1, further comprising:

a cut transition detection unit operable to detect a transition between cuts from the moving picture comprising a plurality of cuts; and a representative cut selection unit operable to select a plurality of representative cuts from the plurality of cuts, wherein the representative picture selection unit is operable to select a second representative picture from each of the plurality of representative cuts, wherein the selected second representative picture is a representative of pictures of the plurality of representative cuts, wherein the configuration image generation unit is operable to generate the configuration image in which the selected second representative picture from each of the plurality of representative cuts is reduced in size at the fixed ratio and arranged in an order of appearance of the plurality of representative cuts in the moving picture, and wherein the plurality of representative cuts are selected to maximize the display occupancy rate of the configuration image in the predetermined range of the display area.

9. The moving picture processing apparatus according to claim 8, wherein the configuration image generation unit is operable to generate the configuration image in which the selected second representative pictures from each of the plurality of representative cuts is arranged in a matrix in the order of appearance of the plurality of representative cuts in the moving picture.

10. The moving picture processing apparatus according to claim 8, wherein the representative cut selection unit is operable to select the plurality of representative cuts based on representative values of feature quantities of the plurality of cuts and a change value of a feature quantity of each cut of the plurality of cuts.

11. The moving picture processing apparatus according to claim 1, wherein the determined number of representative pictures to be displayed in the configuration image is based on a reduction rate at which the selected first representative picture from each of the picture groups is reduced in size.

12. The moving picture processing apparatus according to claim 11, wherein the reduction rate is more than a predefined reduction rate to maximize the display occupancy rate and to secure legibility of the configuration image.

13. The moving picture processing apparatus according to claim 11, wherein the display occupancy rate of the configuration image is calculated based the reduction rate, the determined number of representative pictures to be displayed, a size of the display area, and a size of the plurality of pictures in the moving picture.

14. The moving picture processing apparatus according to claim 1, wherein the display occupancy rate of the configuration image is calculated by Equation (1) below $$Ro = a * Rr * N/A \qquad (1),$$

wherein Ro is the display occupancy rate of the configuration image, "a" is a size of the plurality of pictures in the moving picture, Rr is a reduction rate at which the selected first representative picture from each of the picture groups is reduced in size, N is the determined number of representative pictures to be displayed, and A is a size of the display area.

15. A moving picture processing method comprising:

determining a number of representative pictures to be displayed in a configuration image to maximize a display occupancy rate of the configuration image in a predetermined range of a display area;

classifying a plurality of pictures in a moving picture into picture groups, wherein a number of the picture groups equals the determined number of representative pictures;

selecting a first representative picture from each of the picture groups, wherein the selected first representative picture is a representative of pictures of the corresponding picture group; and generating the configuration image in which the selected first representative picture from each of the picture groups is reduced in size at a fixed ratio and arranged in an order of appearance of the selected first representative picture in the moving picture.

16. A non-transitory computer readable medium having stored thereon, a computer program having at least one code section executable by a computer, thereby causing the computer to perform steps comprising:

determining a number of representative pictures to be displayed in a configuration image to maximize a display occupancy rate of the configuration image in a predetermined range of a display area;

classifying a plurality of pictures in a moving picture into picture groups, wherein a number of the picture groups equals the determined number of representative pictures;

selecting a first representative picture from each of the picture groups, wherein the selected first representative picture is a representative of pictures of the corresponding picture group; and generating the configuration image in which the selected first representative picture from each of the picture groups is reduced in size at a fixed ratio and arranged in an order of appearance of the selected first representative picture in the moving picture.

\* \* \* \* \*